United States Patent [19]

Morris et al.

[11] Patent Number: 5,087,371
[45] Date of Patent: Feb. 11, 1992

[54] METHOD FOR REGENERATING SCALE SOLVENT

[75] Inventors: Richard L. Morris, Duncanville; James M. Paul, DeSoto, both of Tex.

[73] Assignee: Mobil Oil Corporation, Fairfax, Va.

[21] Appl. No.: 612,728

[22] Filed: Nov. 14, 1990

[51] Int. Cl.$^5$ ............................................. B01D 61/40
[52] U.S. Cl. ..................................... 210/643; 210/698
[58] Field of Search ................ 210/698, 643; 166/312; 134/12, 11; 252/175, 180

[56] References Cited

U.S. PATENT DOCUMENTS 4,621,694 11/1986 Wilson et al. ........................ 166/312

Primary Examiner—Frank Spear
Attorney, Agent, or Firm—Alexander J. McKillop; Charles J. Speciale; Lawrence O. Miller

[57] ABSTRACT

Barium sulfate scale is dissolved by contacting the scale with an aqueous solvent having a pH of about 8 to about 14, containing a chelating agent comprising a polyaminopolycarboxylic acid or salt of such an acid, and a synergist anion. The aqueous solvent containing the dissolved scale is regenerated by first acidifying the aqueous solvent sufficiently to generate free alkaline earth metal ions. The aqueous solvent is then mixed with a liquid membrane emulsion enveloped around droplets of an internal aqueous phase containing an anion that forms an insoluble precipitate with the free alkaline earth metal ions. The scale-free aqueous solvent is separated from the emulsion by gravity and recovered for reuse.

In another embodiment, the internal aqueous phase may contain a chelating agent to remove the free alkaline earth metal ions by forming a stable complex with the ions.

24 Claims, No Drawings

METHOD FOR REGENERATING SCALE SOLVENT

CROSS REFERENCE TO RELATIONS APPLICATIONS

This application is related to prior co-pending application Ser. No. 07/332,147, filed Apr. 3, 1989, of J. M. Paul and R. L. Morris; Ser. No. 07/431,114, filed Nov. 3, 1989, of J. M. Paul and R. L. Morris; Ser. No. 07/484,970, filed Feb. 24, 1990, of J. M. Paul and R. L. Morris; and Ser. No. 07/369,897, filed June 22, 1989, now U.S. Pat. No. 4,980,077, granted Dec. 25, 1990, of J. M. Paul and R. L. Morris.

FIELD OF THE INVENTION

This invention relates to aqueous solvent compositions which are effective for solubilizing and removing scale, particularly strontium and barium sulfate scale, from surfaces with scale deposits on them, the improvement residing in a novel treatment of the aqueous solvent containing dissolved scale to regenerate the aqueous solvent for reuse.

BACKGROUND OF THE INVENTION

Many waters contain alkaline earth metal cations, such as barium, strontium, calcium, magnesium, and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water systems, in production systems for oil and gas, in pulp and paper mill systems, and in other systems, causing delays and shutdowns for cleaning and removal.

In the co-pending applications reference above, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates; or (3) thiosulfates. The scale is removed under alkaline conditions, preferably at pH values of at least 10, usually 10-14, with best results being achieved at about pH 12. When the solvent becomes saturated with scale metal cations, the spent solvent is disposed of by re-injection into the subsurface formation. However, this is an expensive way of disposal and requires a fresh supply of moderately expensive solvent.

This invention provides a method to regenerate the spent aqueous solvent using a liquid membrane system.

SUMMARY OF THE INVENTION

In the method for removing alkaline earth sulfate scale by contacting the scale with an aqueous solvent having a pH of about 10 to about 14 and comprising a chelating agent comprising a polyaminopolycarboxylic acid or salt of such an acid and a synergist anion; the improvement comprising removing alkaline earth sulfate scale dissolved in said solvent by reducing the pH of the solvent containing dissolved scale to a pH sufficient to generate free alkaline earth ions, preferably 8 to 9, without forming an insoluble alkaline earth precipitate; mixing the solvent with a liquid membrane emulsion comprising an immiscible liquid hydrocarbonaceous membrane phase containing a soluble surfactant enveloped around droplets of an internal aqueous phase comprising an aqueous solution having a pH of about 4 to about 9 and an acid having anions which form an insoluble precipitate with the free alkaline earth metal ions, wherein the free alkaline earth metal ions transfer from the solvent into the hydrocarbonaceous membrane phase and into the internal aqueous phase where said alkaline earth ions precipitate out as an insoluble salt; recovering the aqueous solvent and increasing the pH of the aqueous solvent to a value of about 10 to about 14 to recover a regenerated solvent for reuse. In another embodiment, the internal aqueous phase may contain a chelating agent instead of the precipitate-forming anions to remove the free alkaline earth metal ions by forming a stable complex with the ions.

DESCRIPTION OF THE PREFERRED EMBODIMENTS

Alkaline earth metal scales, especially barium sulfate scale deposits are removed from oil field and other tubular goods with a scale-removing aqueous solvent comprising a chelating agent and a catalyst or synergist to speed up the dissolution of the scale. The pH of the solvent is maintained at pH values of about 10 to about 14, preferably at about 12, with the addition of potassium hydroxide (caustic potash). Suitable chelating agents comprise polyaminopolycarboxylic acid such as EDTA or DTPA. The catalyst or synergist comprise anions of at least one monocarboxylic acid such as mercaptoacetic acid, aminoacetic acid and hydroxyacetic acid; oxalates, and/or thiosulfates.

The aqueous scale solvent effectively removes all the common oil field scales, including sulfates of barium, calcium and strontium, calcium and iron carbonates. The chelating agent in the aqueous solvent is capable of binding alkaline earth metal ions tightly at high pH levels. This invention describes a method for regenerating the aqueous solvent containing scale using a liquid membrane system. Initially, the pH of the solvent containing the dissolved scale is reduced to about 8 or 9 with the addition of a mineral acid to generate free alkaline earth metal ions without forming an insoluble alkaline earth metal salt. Suitable mineral acids include sulfuric acid or phosphoric acid. The resulting aqueous solvent containing free alkaline earth metal ions is mixed with a liquid membrane emulsion comprising a non-aqueous membrane phase, preferably liquid hydrocarbons containing an anionic surfactant such as dinonyl naphthalene sulfonate or bis (2,4,4-trimethylpentyl) phosphinic acid, and an oil soluble emulsifier in an amount of 1 to 3% by weight of the liquid membrane emulsion, encapsulating an internal aqueous phase having a pH of from about 4 to 9, preferably 5 to 7, and a precipitate-forming anion. Commercially available dinonyl naphthalene sulfonate is sold under the trademark "Synex DN-052" from King Industries and bis (2,4,4,-trimethylpentyl) phosphinic acid is sold under the trademark "CYANEX 272" from American Cyanamide Company. The liquid membrane emulsion is immiscible with the aqueous solvent containing the dissolved scale. A suitable oil soluble emulsifier is sorbitan monooleat manufactured under the tradename "Span" from Fluka Chemie AG, Switzerland. The oil soluble surfactant in the oil membrane aids in transferring the free alkaline earth metal ions from the aqueous solvent through the oil membrane and into the internal aqueous phase where they form an insoluble salt with precipitate-forming anions. If the pH of the internal phase is controlled by a sufficient quantity of a mineral acid such as phosphoric acid or sulfuric acid, which forms an insoluble salt with the alkaline earth metal ions, substantially all of the barium and other alkaline earth metals will be precipitated out as an insoluble salt such as phosphate or sulfate. Anions as sulfate or phosphate in solution in the internal aqueous phase are suitable for forming precipitates with the released metal ions. The following equations illustrate precipitation of barium ions using phosphoric and sulfuric acid:

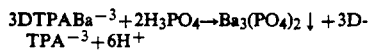

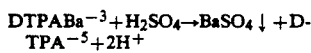

The amount of the precipitate-forming anion in the internal aqueous phase which is required will depend upon the concentration of the scale-forming metal (Ba, Ca, Sr) in the solvent. Sufficient precipitate forming anion should be added to ensure that the solubility product of the insoluble species is exceeded and that substantially all of the alkaline earth cations are removed as insoluble precipitate.

Thereafter the scale-free aqueous solvent is separated from the hydrocarbonaceous membrane phase enveloping the internal aqueous phase containing the precipitate scale by gravity and recovered. Before reuse, the pH of the scale-free aqueous solvent is increased to a pH of about 10 to about 14, preferably about 12, by the addition of potassium hydroxide. Thereafter, the liquid membrane emulsion is broken by suitable means such as heating or centrifuging thereby separating the internal aqueous phase containing the precipitated scale from the hydrocarbonaceous membrane phase. The precipitated scale is recovered from the internal aqueous phase by filtration or centrifuging and disposed of in a safe manner since the precipitate scale may contain radioactive materials.

In another embodiment, instead of using an internal aqueous phase containing precipitate-forming anions to remove the alkaline earth metal ions, the internal aqueous phase may comprise an aqueous solution having a pH of about 8 to about 14 and a chelating agent which removes the alkaline earth metal ions by forming a stable complex with the ions. The amount of the chelating agent which is required will depend upon the concentration of the scale-forming metal (Ba, Ca, Sr) in the solvent. Suitable chelating agents comprise a polyaminopolycarboxylic acid or a salt of such an acid such as EDTA or DTPA. The concentration of the chelate in the internal aqueous phase should normally be at least 0.1M in order to achieve an acceptable degree of removal of the free alkaline earth ions from the solvent. Chelant concentrations in excess of 1.0M are usually not necessary and concentrations from about 0.3M up to about 0.6M will normally give good results. Although higher concentrations of chelant may be used, there is generally no advantage to doing so because the efficiency of the chelant utilization will be lower at excess chelant concentrations.

Thereafter, the scale-free aqueous solvent is recovered by gravity separation from the liquid membrane emulsion. Before reuse, the pH of the scale-free aqueous solvent is increased to a pH of about 10 to about 14, preferably about 12, by the addition of potassium hydroxide to recover a regenerated aqueous solvent for reuse to dissolve scale. Thereafter, the liquid membrane emulsion is broken by heating or centrifying to separate the internal aqueous phase containing the chelating agent complexed with the alkaline earth metal ions from the hydrocarbonaceous membrane phase. The internal aqueous phase containing the chelating agent complexed with scale is recovered by gravity separation and disposed of in a safe manner since the scale may contain radioactive material.

What is claimed is:

1. In the method for removing alkaline earth sulfate scale by contacting the scale with an aqueous solvent having a pH of about 10 to about 14 and comprising a chelating agent comprising a polyaminopolycarboxylic acid or salt of such an acid, and a synergist anion; the improvement comprising removing alkaline earth metal sulfate scale dissolved in said aqueous solvent by:
   (a) acidifying the aqueous solvent containing dissolved scale sufficiently to generate free alkaline earth metal ions without forming an insoluble alkaline earth metal precipitate;
   (b) mixing the aqueous solvent with a liquid membrane emulsion comprising an immiscible liquid hydrocarbonaceous membrane phase containing a soluble surfactant, and an oil soluble emulsifier, said liquid membrane emulsion enveloped around droplets of an internal aqueous phase acidified in the presence of an anion which forms a precipitate of an insoluble salt of the free alkaline earth metal ions that transfer from the aqueous solvent into the hydrocarbonaceous membrane phase and into the internal aqueous phase; and
   (c) recovering the aqueous solvent and increasing the pH of the aqueous solvent to a value of about 10 to about 14 to recover a regenerated aqueous solvent.

2. A method according to claim 1 wherein the chelating agent comprises DTPA.

3. A method according to claim 1 wherein the chelating agent comprises EDTA.

4. A method according to claim 1 wherein the scale comprises barium, strontium or calcium sulfate and mixtures thereof and naturally occurring radioactive material (NORM), mainly radium 226 and radium 228.

5. A method according to claim 1 wherein the synergist comprises a monocarboxylic acid.

6. A method according to claim 5 in which the monocarboxylic acid is salicylic acid or a substituted acetic acid.

7. A method according to claim 1 wherein the synergist is oxalate.

8. A method according to claim 1 wherein the aqueous solvent is acidified in step (a) with sulfuric acid or phosphoric acid.

9. A method according to claim 1 wherein the pH of the solvent in step (a) is reduced to about 8 or 9 by the acidification.

10. A method according to claim 1 wherein the pH of the internal phase in step (b) is about 4 to 9.

11. A method according to claim 1 wherein the pH of the aqueous solvent in step (c) is increased by the addition of potassium hydroxide.

12. A method according to claim 1 wherein the surfactant is dinonyl naphthalene sulfonate or bis (2,4,4-trimethylpentyl) phosphinic acid.

13. A method according to claim 1 wherein the oil soluble emulsifier is sorbitan monooleat in an amount of 1 to 3% by weight of said liquid membrane emulsion.

14. In the method for removing alkaline earth sulfate scale by contacting the scale with an aqueous solvent having a pH of about 8 to about 14 and comprising a chelating agent comprising a polyaminopolycarboxylic acid or salt of such an acid, and a synergist anion; the improvement comprising removing alkaline earth sulfate scale dissolved in said aqueous solvent by:

(a) acidifying the aqueous solvent containing dissolved scale sufficiently to generate free alkaline earth metal ions without forming an insoluble alkaline earth precipitate;

(b) mixing the aqueous solvent with a liquid membrane emulsion comprising an immiscible liquid hydrocarbonaceous membrane phase containing a soluble surfactant and an oil soluble emulsifier, said liquid membrane emulsion enveloped around droplets of an internal aqueous phase comprising an aqueous solution having a pH of from about 8 to about 14 and a chelating agent comprising a polyaminopolycarboxylic acid or a salt of such an acid, wherein the free alkaline earth ions transfer from the solvent into the hydrocarbonaceous membrane and into the internal aqueous phase where the ions are removed by the chelating agent; and (c) recovering the aqueous solvent and increasing the pH of the aqueous solvent to a value of about 10 to about 14 to produce a regenerated aqueous solvent for reuse.

15. A method according to claim 14 wherein the chelating agent comprises DTPA.

16. A method according to claim 14 wherein the scale comprises barium, strontium or calcium sulfate and mixtures thereof and naturally occurring radioactive material (NORM), mainly radium 226 and radium 228.

17. A method according to claim 14 wherein the scale comprises barium, strontium or calcium sulfate and mixtures thereof and naturally occurring radioactive material (NORM), mainly radium 226 and radium 228.

18. A method according to claim 14 wherein the synergist is oxalate.

19. A method according to claim 14 wherein the pH of the solvent in step (a) is reduced to about 8 or 9 by the acidification.

20. A method according to claim 14 wherein the pH of the solvent in step (c) is increased by the addition of potassium hydroxide.

21. A method according to claim 1 wherein the chelating agent is present in an amount of 0.1M to 1.0M.

22. A method according to claim 14 wherein the aqueous solvent in step (a) is acidified with sulfuric acid or phosphoric acid.

23. A method according to claim 14 wherein the chelating agent is DTPA or EDTA.

24. A method according to claim 14 wherein the surfactant is dinonyl naphthalene sulfonate or bis (2,4,4-trimethylpentyl) phosphinic acid.

* * * * *